United States Patent
Harkins et al.

(10) Patent No.: US 7,011,739 B2
(45) Date of Patent: Mar. 14, 2006

(54) METHOD FOR SANITIZING SHELLS OF EGGS USING ELECTROLYZED OXIDIZING WATER

(76) Inventors: Gene Harkins, 3760 S. Highland Dr., Suite 500, Salt Lake City, UT (US) 84106; Brian Warren, 50 Highland Park, Sharpsburg, GA (US) 30277

( * ) Notice: Subject to any disclaimer, the term of this patent is extended or adjusted under 35 U.S.C. 154(b) by 0 days.

(21) Appl. No.: 10/103,210

(22) Filed: Mar. 21, 2002

(65) Prior Publication Data

US 2002/0175085 A1 Nov. 28, 2002

Related U.S. Application Data

(60) Provisional application No. 60/277,849, filed on Mar. 22, 2001.

(51) Int. Cl.
*A23B 5/06* (2006.01)

(52) U.S. Cl. .................. 205/701; 205/742; 426/298
(58) Field of Classification Search .............. 205/742, 205/701; 426/298
See application file for complete search history.

(56) References Cited

U.S. PATENT DOCUMENTS

| | | | | |
|---|---|---|---|---|
| 5,756,139 A | * | 5/1998 | Harvey et al. | 426/298 |
| 5,858,201 A | * | 1/1999 | Otsuka et al. | 205/701 |
| 6,354,522 B1 | * | 3/2002 | Iwata et al. | 239/690 |

* cited by examiner

*Primary Examiner*—Arun S. Phasge
(74) *Attorney, Agent, or Firm*—Bracewell & Guiliani LLP

(57) ABSTRACT

The present invention relates to methods of sanitizing the shells of eggs, which are used for human consumption and also as hatchlings. More specifically, the present invention relates to a method of sanitizing eggs using an electrostatic sprayer with electrolyzed oxidizing water produced from an electrolyte solution. It is the overall objective of the present invention to provide a method for sanitizing eggs comprising the steps of passing an electrolyte solution through a water electrolysis machine in combination with feed water to produce electrolyzed oxidizing water, and then spraying the eggs with the electrolyzed oxidizing water by using an electrostatic sprayer which creates a negative charge on the spray droplets as they leave the sprayer.

3 Claims, No Drawings

METHOD FOR SANITIZING SHELLS OF EGGS USING ELECTROLYZED OXIDIZING WATER

CROSS-REFERENCE TO RELATED APPLICATIONS

This application is a continuation of Provisional Patent Application, Ser. No.: 60/277,849 filed Mar. 22, 2001.

THE FIELD OF THE INVENTION

The present invention relates to methods of sanitizing the shells of eggs which are used for human consumption and also as hatchling eggs. More specifically, the present invention relates to a method of sanitizing eggs with electrolyzed oxidizing water (herein EO water) produced from an electrolyte solution and then spraying the eggs with the electrolyzed oxidizing water by using an electrostatic sprayer.

BACKGROUND OF INVENTION

Egg products are an important part of the diet of the American people and of nations all over the world. Eggs are generally a very safe food source and are relied on by many as a good source of protein. Due to their nutrient-dense character, eggs are also a good growth medium for bacteria. The United States weekly chicken broiler production is more than 150 million per week and the consumption of chicken is rising. Eggs have been found which contain the bacterium *Salmonella enteritidis* in about one in every 20,000 eggs. Other bacteria of concern to the poultry industry in the processing and sanitizing of eggs are *Staphylcoccus aureus, Listeria monocytogenes* and *Escherichia coli.*

A. Washing and Sanitizing Eggs Used for Human Consumption

In order to assure that eggs remain a safe and dependable food, governmental regulations have been adopted which require the washing and sanitizing of eggs used for human consumption. Eggs are generally washed as quickly as possible after laying in order to remove soil and bacteria from their surface and to help prevent bacterial penetration of the shell. Today most eggs are cleaned in mechanical egg washers that employ sprayers, brushes, detergents, rinses and dryers. Governmental regulations require that the eggs not be immersed at any time, although they may be sprayed with water at a temperature about the same as the temperature of the wash water. After eggs are washed they are sprayed with a sanitizing agent.

The present systems and methods of sanitizing eggs used for human consumption have many disadvantages:

(a). Presently used sanitizing agents are chemicals such as quaternary ammonium, phenolics and hydrogen peroxide. When these sanitizing agents are used workers are required to wear protective clothing.

(b). The disposal of presently used chemical sanitizing agents may require special and expensive disposal methods in order to comply with environmental regulations.

(c). Because governmental regulations prohibit eggs from being immersed in wash water or a sanitizing agent, these are applied by sprayers. Many current sprayer technologies are limited in their effectiveness because the sprayers only coat the surface of the egg which is directly in front of the sprayer. These methods attempt to obtain adequate coverage of the egg surface by rotation of the egg or by additional different directional sprayers.

(d). With the present spraying methods the contact time of the sanitizing agent and the egg is limited to the flow time of the spray off the surface of the egg. The length of contact time of the sanitizing agent on the surface of the egg is a critical factor in the effectiveness of the sanitizing agent.

OBJECTS AND ADVANTAGES

Several objects and advantages of the present invention are:

(a). Provides a sanitizing agent the use of which does not require special protective clothing.

(b). Provides a sanitizing agent that is environmentally friendly and is free from toxins and harmful chemical residues and that can be disposed of without any special disposal methods. Electrolyzed oxidizing water can be disposed of by pouring it down the ordinary water sewer.

(c). Provides a system where the spray of the sanitizing agent from the electrostatic sprayer covers the entire surface of the egg and the volume of the spray that adheres to the surface of the egg is substantially increased.

(d). Provides that the spray of the sanitizing agent adheres to the surface of the egg for a significantly longer time than present sanitizing methods there by increasing the effectiveness of the sanitizing agent.

(e) Because of the electrical bond between the electrostatic spray droplets which have a negative charge and the surface of eggs which have a positive charge less total sanitizing agent is required than present spraying methods.

B. Sanitizing Hatchling Eggs

Shell surface contamination of hatchling eggs is inevitable in the breeder house. Hatchling eggs are usually set from one to ten days after they are laid. During hatching egg storage there is a great multiplication of the bacteria on the shell surface. This increases the probability of bacteria invading the interior of the egg and destroying the developing embryo.

The present systems and method of sanitizing hatchling eggs have many disadvantages:

(a) All of the disadvantages listed under the above section on the present methods and systems of sanitizing eggs for human consumption apply to the sanitizing of hatchling eggs.

Additional disadvantages of present systems and methods as relates to hatchling eggs are as follows:

(b) A present alternative method to spraying hatchling eggs is to fumigate the eggs with formaldehyde gas. Formaldehyde gas burns peoples lungs and eyes when they are exposed to it. This requires the workers to wear protective masks and clothing. Egg shells are porous and the developing chick embryo needs a sufficient supply of oxygen. Too much formaldehyde gas can kill some of the chick embryos.

(c) The present use of sprayed sanitizing agents such as quaternary ammonium, phenolics and hydrogen peroxide and fumigating with formaldehyde gas leaves toxic chemical residues on the egg shell which can clog its pores and deprive the developing embryo of sufficient oxygen.

OBJECTS AND ADVANTAGES (a) All of the advantages of the present invention as relates to the sanitizing eggs for the use of human consumption apply to the sanitizing of hatchling eggs.

Additional advantages of the present invention as relates to the sanitizing of hatchling eggs are as follows:

(b) Unlike formaldehyde gas, excess spray of electrolyzed oxidizing water on the hatchling eggs is not harmful to the developing chick embryo.

(c) The spray of electrolyzed oxidizing water on the hatchling eggs leaves no chemical residue which would clog the pores of the hatchling egg.

BRIEF SUMMARY OF THE INVENTION

The objective of the present invention is to provide a method for sanitizing the shells of eggs comprising the steps of producing an electrolyte solution, passing the electrolyte solution through a water electrolysis machine in combination with feed water, to produce electrolyzed oxidizing water and then spraying the eggs with the electrolyzed oxidizing water by using an electrostatic sprayer.

DETAILED DESCRIPTION OF THE INVENTION

The following more detailed description of the embodiments of the method of the present invention is not intended to limit the scope of the invention as claimed but is merely representative of presently preferred embodiments of the invention.

Electrolyzed oxidizing water is a product which comprises an acidic solution having a pH of at least about 2.4–2.5 and below, and has an oxidation-reduction potential of at least about 1100–1400 millivolts ("mV"). Electrolyzed oxidizing water has free chlorine in proportions of about 10 mg/L and hypochlorous acid in proportions of about 11 mg/L.

The present invention relates to the method of sanitizing eggs with electrolyzed oxidizing water produced from an electrolyte solution, and then sprayed on the eggs utilizing an electrostatic sprayer. Electrostatic sprayers break down the droplet size to about 30 microns in diameter, and add either a positive or negative charge to the surface of each droplet. Because the surface of eggs have a positive charge and the spray droplets have a negative charge the droplets are attracted to the surface of the egg and surround the egg in an "electrostatic wrap around". The electrical charge of the spray substantially increases the volume of spray that adheres to the egg and substantially increases the time that the spray stays on the egg thereby increasing its sanitizing effect. Examples of these electrostatic sprayers are those built by Electrostatic Spraying Systems, Inc.

In one presently preferred embodiment, an electrolyte solution is made by combining tap or other water with a concentration of about 1% or 50% sodium chloride. However, a concentration of 10% to 30% sodium chloride is more preferable. In certain embodiments a concentration of about 20% of sodium chloride is preferred. In other embodiments the NaCl may be used in concentration of about 125 g/liter.

The sodium chloride in the electrolyte solution serves as the major electrolyte in increasing electrical conductivity for the process of electrolysis. During electrolysis several ionic and non-ionic chemical species are generated including $H^+$, $ClO$, $H_2O_2$, $Cl$, $HClO$, $Cl_2$ and $OH^-$. The combination of these ions, as well as the low pH and the high oxidation reduction potential (ORP) account for the bactericidal action of the electrolyzed oxidizing water.

According to another embodiment of the invention, an electrolyte solution for producing electrolyzed oxidizing water includes sodium chloride (NaCl) and sodium phosphate ($NaH_2PO_4$). Sodium phosphate added to the electrolyte mixture provides a source of phosphate ions to increase the cleansing action of the electrolyzed oxidizing water. In some embodiments, the weight ratio of $NaH_2PO_4$ to NaCl can be in a range of from about 0.018 to about 0.040. In some embodiments, the $NaH_2PO_4$ can be in a concentration range of from about 2.3 to 5.0 g/liter, and the NaCl in a concentration of about 125 g/liter.

The electrolyte solution contains sodium chloride (NaCl) and sodium phosphate $NaH_2PO_4$ which are dissolved in high quality tap water, deionized tap water, or softened (reduced calcium content) water. Suitable concentrations of these compounds for use in flow through electrolyzers are:

| | |
|---|---|
| NaCl | 125 g/L |
| $NaH_2PO_4$ | 2.3–5.0 g/L |

This is equivalent to a weight ratio of $NaH_2PO_4$ to NaCl of about 0.018–0.040.

While the electrolyte may consist essentially of NaCl or NaCl and $NaH_2PO_4$, according to another aspect of the invention, the electrolyte may further include amidosulfonic acid ($H_3NO_3S$). In some embodiments, the weight ratio of $H_3NO_3S$ to NaCl can be from about 0.005 to about 0.008. In some embodiments, the $H_3NO_3S$ to NaCl can be in a concentration of from about 0.6 to about 1.1 g/liter. In these embodiments, the electrolyte may consist essentially of NaCl, $NaH_2PO_4$, and $H_3NO_3S$. When amidosulfonic acid ($H_2NO_3S$) is added to make an electrolyte solution the following concentrations are also suitable for use:

| | |
|---|---|
| NaCl | 125 g/L |
| $NaH_2PO_4$ | 2.3–5.0 g/L |
| $H_3NO_3S$ | 0.6–1.1 g/L |

Here, in this example of an electrolyte solution, the amidosulfonic acid aids in preventing the accumulation of scale in the electrolysis machine and may also add to the cleaning (solvent) action of the product water from the electrolysis machine.

The above electrolyte solution with amidosulfonic acid was tested in a water electrolysis machine in combination with feed water that had been passed through a bed of activated charcoal ion exchange resins, and finally through 0.5 and 0.2 micron filters. Again, the electrolyte solution was passed into the machine at a volume ratio of 1:316 to feed water that was passed through the machine. The electrolyzed oxidizing water that was produced had an oxidative/reduction potential (ORP) of 1,100–1,140$^+$ mV and a pH of 2.7–2.3. The co-produced alkaline water had a pH of 11.2–11.4 and an ORP of about 840–847$^-$ mV. The combination of the prepared feed water and use of this electrolyte mixture is apparently well suited for use in flow through electrolysis machines. Over 5,000 gallons of electrolyzed water were produced without change in the ORP of the water. This would indicate that the machine remained relatively free of scale.

Pure water cannot be electrolyzed to any useful degree. When water containing sodium and chloride ions ($Na^+$, $Cl^-$) derived from the dissolution of NaCl when electrolyzed, the ions migrate to opposite electrical poles. Specifically, when electrical energy is supplied to the electrolysis machine, $Na^+$ flows in a net mass manner toward the cathode (−) and Cl⁺ to the anode (+).

Water is decomposed (electrolyzed) due to the high reactivity of $Na^+$:

$$2Na^+ + 2H_2O = 2NaOH + H_2.$$

Since sodium ions are attracted to the cathode, the above reaction occurs in the cathodic channel to form a small amount of hydroxide as water flows through the channel. The sodium hydroxide (NaOH) ionizes as $NaOH = Na^+ + OH'$. The water from the cathode channel is called electrolyzed alkaline water. Electrolyzed alkaline water is an excellent cleaning solution particularly with lipid-based or organic stains.

In the anodic channel, where chloride ions (Cl') accumulate, electrons from Cl' are given up to the electron deficient anode and hence:

$$2Cl' - 2e' = Cl_2$$

The chlorine is soluble in water and reacts with water as:

$$Cl_2 + H_2O - HOCl + H^+ + Cl'$$

This forms a small amount of hydrochloric and hypochlorous acids as water flows through the channel. Typically hypochlorous acid is present at about 11 mg/L in the electrolyzed oxidizing water. Other reactions occurring in the anodic channel include the formation of small amounts of hydrogen peroxide and ozone ($H_2O_2$ and $O_3$). The water from the anode channel is called electrolyzed oxidizing water or acid water. Owing to these chemical species, the solution is both acidic and oxidative. The overall relative oxidative reduction potential (ORP) is in the range of 1100 to 1400 millivolts. Bacteria and viruses are readily killed by this solution, but it is safe for humans and animals, even when it is accidentally ingested.

From the above it is clear that water molecules are split in both channels. When this chemistry is divided by a conductive diaphragm or membrane, the net balance of chemical species is such that alkaline water (pH 11.2 to 11.5) is derived from the cathodic channel, and acid oxidative water (pH 2.7 to 2.3) is derived from the anodic channel. This overall process is driven by the input of electrical energy and hence described by the term electrolysis.

While the above described examples recite the use of filtered water as feed water, other types of water can be used for feed water, including tap water, deionized water, and distilled water, or a combination of any of the aforesaid feed waters.

The flow through electrolyzing system used in testing the electrolyte mixture simultaneously produces both electrolyzed oxidizing water and electrolyzed alkaline water. It is thought by some investigators that electrolyzed water is restructured such that the cluster size (number of water molecules that are weak-hydrogen-bonded to form molecular aggregates) is smaller than for ordinary water. Smaller cluster size would predictably, reduce viscosity.

Electrolyzed oxidizing water produced as described above was tested for antibacterial effect. Between $10^5$–$10^6$ bacteria isolated from packaged chicken were added to one ml of acid water. After a 15, 30, 60 and 120 seconds 25 μl aliquots were spread onto bacteriological agar culture plates. After 36 hours of incubation at 37° C., the plates were visually examined for the presence of bacterial colonies. No colonies on the plates were observed. In contrast, when sterile tap or distilled water was used instead of the electrolyzed oxidizing water in identically structured tests, the culture plates were covered with bacterial colonies visible to the naked eye.

Electrolyzed oxidizing water is effective in reducing the risk of food contamination by killing disease causing bacteria. The bactericidal effect of electrolyzed oxidizing water obtained by electrolysis of tap water was determined to be highly effective in killing bacteria When electrolyzed oxidizing water is sprayed on eggs using an electrostatic spray device, a five-log reduction in bacteria is achieved.

Electrolyzed oxidizing water is an acidic solution having pH 2.6 or below, oxidation-reduction potential (ORP) 1,100 mV or move, free hypochlorous acid of about 11 mg/L and free chlorine in the range of about 10 mg/L. An analysis of electrolyzed oxidizing water is shown on the following Table:

| Replication | 1 | 2 | 3 |
|---|---|---|---|
| PH | 2.39 | 2.41 | 2.41 |
| ORP (mV) | 1170 | 1166 | 1168 |
| Chlorine (total, mg/L) | 11 | 11 | 12 |
| Chlorine (free, mg/L) | 10 | 9 | 10 |
| HOCl (free, mg/L) | 11 | 11 | 11 |
| OCl (free, mg/L | 0.3 | 0.3 | 0.3 |
| Chloride ion (mg/L) | 408 | 371 | 391 |
| Sodium ion (mg/L) | 161 | 159 | 163 |

The foregoing analysis was performed by Yen-Con Hung, Ph.D., Professor of Food Science and Technology, University of Georgia, Griffin, Ga.

The use of electrostatic sprayers in the invention yields excellent results by breaking down the size of the spray droplets that are carried to the egg on an air stream. Such sprayers give an electrostatic charge to the surface of droplets, as they become airborne. The electrical charge on the surface of the spray droplets cause them to be attracted to the egg. Also, the electrical charge enables the spray droplets to alter their trajectories around the egg being sprayed, even to the point of entirely reversing their flight path, in order to coat the back of the egg being sprayed. This action is often referred to as "electrostatic wrapping", and is dependent on the electrostatic forces of the droplets dominating over gravity, inertia, and the force of air currents. Factors such as the size and weight of the droplets are also critical. The electrical charge of the spray droplets substantially increases the volume of spray that adheres to the egg and substantially increases the time the spray stays on the surface of the egg thereby increasing its sanitizing effect.

The present invention may be embodied in other specific forms without departing from its structures methods, or other essential characteristics as broadly described and claimed herein. The described embodiments are to be considered in all respects only as illustrative and not restrictive.

We claim:

1. A method of sanitizing shells of eggs, both those used for human consumption and also hatchling eggs, by using electrolyzed oxidizing water comprising:
   a. Producing electrolyzed oxidizing water by using an electrolyte solution containing sodium chloride (NaCl), and
   b. Spraying the electrolyzed oxidizing water on the eggs by using an electrostatic sprayer that creates on the spray droplets a positive or negative electrical charge.

2. A method of sanitizing shells of eggs, both those used for human consumption and also hatchling eggs by using electrolyzed oxidizing water comprising:
   a. Producing electrolyzed oxidizing water by using an electrolyte solution that contains sodium chloride (NaCl) and sodium phosphate ($NaH_2PO_4$), and b. Spraying this electrolyzed oxidizing water on the eggs by using an electrostatic sprayer that creates on the spray droplets a positive or negative electrical charge.

3. A method of sanitizing shells of eggs, both those used for human consumption and also hatchling eggs by using electrolyzed oxidizing water comprising:

a. Producing electrolyzed oxidizing water by using an electrolyte solution that contains sodium chloride (NaCl), sodium phosphate ($NaH_2PO_4$), and amidosulfonic acid ($H_2NO_3S$), and b. Spraying this electrolyzed oxidizing water on the eggs by using an electrostatic sprayer that creates on the spray droplets a positive or negative electrical charge.

* * * * *